(12) United States Patent
Surendranath et al.

(10) Patent No.: US 11,431,016 B2
(45) Date of Patent: Aug. 30, 2022

(54) BINDER FOR ELECTROLYTE MATRIX FOR MOLTEN CARBONATE FUEL CELLS

(71) Applicant: FuelCell Energy, Inc., Danbury, CT (US)

(72) Inventors: Arun Surendranath, Danbury, CT (US); Abdelkader Hilmi, Bethel, CT (US); Chao-Yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 228 days.

(21) Appl. No.: 15/486,160

(22) Filed: Apr. 12, 2017

(65) Prior Publication Data
US 2018/0301728 A1    Oct. 18, 2018

(51) Int. Cl.
  *H01M 8/14*   (2006.01)
  *C08L 33/10*  (2006.01)
  *H01M 8/0295* (2016.01)

(52) U.S. Cl.
  CPC .............. *H01M 8/142* (2013.01); *C08L 33/10* (2013.01); *H01M 8/0295* (2013.01); *H01M 8/145* (2013.01); *C08L 2203/20* (2013.01); *C08L 2205/02* (2013.01); *H01M 2008/147* (2013.01); *H01M 2300/0051* (2013.01); *Y02E 60/50* (2013.01)

(58) Field of Classification Search
  CPC ................................................. C08L 2205/02
  See application file for complete search history.

(56) References Cited

U.S. PATENT DOCUMENTS

| 4,242,426 | A | 12/1980 | Arendt | |
|---|---|---|---|---|
| 4,411,968 | A | 10/1983 | Reiser et al. | |
| 7,678,470 | B2 | 3/2010 | Yoon et al. | |
| 2003/0165744 | A1* | 9/2003 | Schubert | H01M 2/0257 429/303 |
| 2005/0101694 | A1* | 5/2005 | Elmer | C09D 11/30 523/160 |
| 2010/0159355 | A1* | 6/2010 | Hata | H01B 1/122 429/495 |
| 2011/0287333 | A1 | 11/2011 | Shin et al. | |
| 2014/0272114 | A1* | 9/2014 | Oriakhi | H01M 4/9033 427/115 |
| 2015/0214564 | A1* | 7/2015 | Hilmi | H01M 8/145 429/478 |
| 2016/0293999 | A1* | 10/2016 | Kim | H01M 10/052 |
| 2017/0250400 | A1* | 8/2017 | Al | H01M 2/1653 |

FOREIGN PATENT DOCUMENTS

KR     20120029787 A  *  3/2012

OTHER PUBLICATIONS

International Search Report and Written Opinion in PCT/US2018/027101 dated Jun. 25, 2018 (12 pages).

\* cited by examiner

*Primary Examiner* — Dustin Q Dam
(74) *Attorney, Agent, or Firm* — Foley & Lardner LLP

(57) ABSTRACT

A binder solution for an electrolyte matrix for use with molten carbonate fuel cells is provided. The binder solution includes a first polymer with a molecular weight of less than about 150,000 and a second binder with a molecular weight of greater than about 200,000. The binder solution produces an electrolyte matrix with improved flexibility, matrix particle packing density, strength, and pore structure.

13 Claims, 4 Drawing Sheets

BINDER FOR ELECTROLYTE MATRIX FOR MOLTEN CARBONATE FUEL CELLS

STATEMENT OF GOVERNMENT RIGHTS

This invention was made with government support under Cooperative Agreement DE-EE0006606 awarded by the U.S. Department of Energy. The government has certain rights in this invention.

BACKGROUND

The present disclosure relates to matrices for supporting an electrolyte in a molten carbonate fuel cell including an organic binder.

Molten carbonate fuel cells (MCFC) are of great interest for power generation, due to their high efficiency and clean conversion of chemical energy into electric energy. Generally carbonate fuel cells operate at intermediate temperatures (575° C.-650° C.) and employ carbonaceous fuels containing carbon dioxide and carbon monoxide. A typical carbonate fuel cell assembly may include a porous Ni anode stabilized against sintering by Cr and/or Al additives and a porous in-situ oxidized and lithiated NiO cathode. The anode and cathode may be separated by a molten alkali carbonate electrolyte, such as $Li_2CO_3/K_2CO_3$ or $Li_2CO_3/Na_2CO_3$, contained within a porous ceramic matrix, such as $LiAlO_2$.

The electrolyte matrix, sandwiched between the electrodes, serves to isolate the fuel from the oxidant, store electrolyte, and facilitate ionic transport. The electrolyte matrix may be a micro-porous ceramic structure that retains a liquid electrolyte by capillary force. An $LiAlO_2$ powder ($\alpha$ or $\gamma$-phase) is a common material used as a matrix support, and is mixed with a binder system to produce electrolyte matrices. The binder system impacts the quality, mechanical properties, pore structure, particle packing density and gas sealing efficiency of the electrolyte matrix. During the handling of the electrolyte matrix cracks or other defects may form if the binder material is not sufficiently flexible. Thus, it would be advantageous to provide a binder system that produces an electrolyte matrix with improved flexibility, particle packing density, strength, and pore structure.

SUMMARY

In certain embodiments, a green electrolyte matrix is provided. The green electrolyte matrix includes a support material, an electrolyte material, and a binder. The binder includes a first polymer with a molecular weight of less than about 150,000 and a second polymer with a molecular weight of greater than about 200,000.

In one aspect, the first polymer is present in the electrolyte matrix in an amount of about 4 wt. % to about 12 wt. %.

In one aspect, the first polymer comprises an ethyl methacrylate copolymer.

In one aspect, the second polymer is present in the electrolyte matrix in an amount of about 0.1 wt. % to about 3 wt. %.

In one aspect, the second polymer comprises a methyl methacrylate-butyl acrylate copolymer.

In one aspect, the molecular weight of the second polymer is at least twice the molecular weight of the first polymer.

In one aspect, the binder further comprises a plasticizer.

In one aspect, the support material comprises lithium aluminate.

In one aspect, the electrolyte material comprises lithium carbonate.

In one aspect, the electrolyte matrix comprises a reinforcing material.

In one aspect, the electrolyte matrix is substantially free of pores with a size of 0.2 µm or greater.

In other embodiments, an electrolyte matrix is provided. The electrolyte matrix includes a support material and an electrolyte material. The electrolyte matrix is substantially free of pores with a size of 0.2 µm or greater, and is formed from a green matrix having a binder. The binder includes a first polymer with a molecular weight of less than about 150,000 and a second polymer with a molecular weight of greater than about 200,000.

In one aspect, the electrolyte matrix is formed from the green matrix by burning away the binder from the green matrix.

In one aspect, the electrolyte matrix exhibits a snap strength of greater than 1,000 psi.

In other embodiments, a method for making an electrolyte matrix is provided. The method comprises preparing a slurry, preparing a binder solution, mixing the binder solution and the slurry, and drying the mixture of the binder solution and the slurry to form an electrolyte matrix. The slurry comprises a support material, an electrolyte material, and a first solvent. The binder solution is prepared by mixing a first polymer with a molecular weight of less than about 150,000, a second polymer with a molecular weight of greater than about 200,000, and a second solvent.

In one aspect, preparing the slurry comprises an attrition milling process that reduces the size of the materials in the slurry.

In one aspect, the method further comprises tape casting the slurry before drying the slurry.

In one aspect, the method further comprises adding a reinforcing material to the slurry.

In one aspect, the binder solution further comprises a plasticizer.

In one aspect, the method further comprises conditioning the electrolyte matrix by burning out substantially all of the binder solution from the electrolyte matrix.

In other embodiments, a binder solution is provided. The binder solution comprises a first polymer with a molecular weight of less than about 150,000, a second polymer with a molecular weight of greater than about 200,000, a plasticizer, and a solvent.

In one aspect, the first polymer comprises an ethyl methacrylate copolymer.

In one aspect, the second polymer comprises a methyl methacrylate-butyl acrylate copolymer.

In one aspect, the first polymer is present in an amount of about 30 wt. % to about 40 wt. %.

In one aspect, the second polymer is present in an amount of about 1 wt. % to about 10 wt. %.

In one aspect, the solvent comprises methyl ethyl ketone, cyclohexane, or combinations thereof.

In one aspect, the solvent is present in an amount of about 20 wt. % to about 60 wt. %.

In one aspect, the plasticizer comprises butyl benzyl phthalate.

In one aspect, the plasticizer is present in an amount of about 10 wt. % to about 20 wt. %.

In other embodiments, a method of making a binder solution is provided. The method comprises combining a first polymer with a molecular weight of less than about 150,000, a second polymer with a molecular weight of greater than about 200,000, and a solvent to form a mixture, and stirring the solution to produce a binder solution.

In one aspect, the stirring continues for a period of about 1 hour to about 3 hours.

In one aspect, the solvent comprises methyl ethyl ketone, cyclohexane, or combinations thereof.

In one aspect, the method further comprises adding a plasticizer to the binder solution.

In other embodiments, a fuel cell is provided. The fuel cell comprises any of the electrolyte matrices described herein.

These and other advantageous features will become apparent to those reviewing the disclosure and drawings.

DETAILED DESCRIPTION

Figure 1:
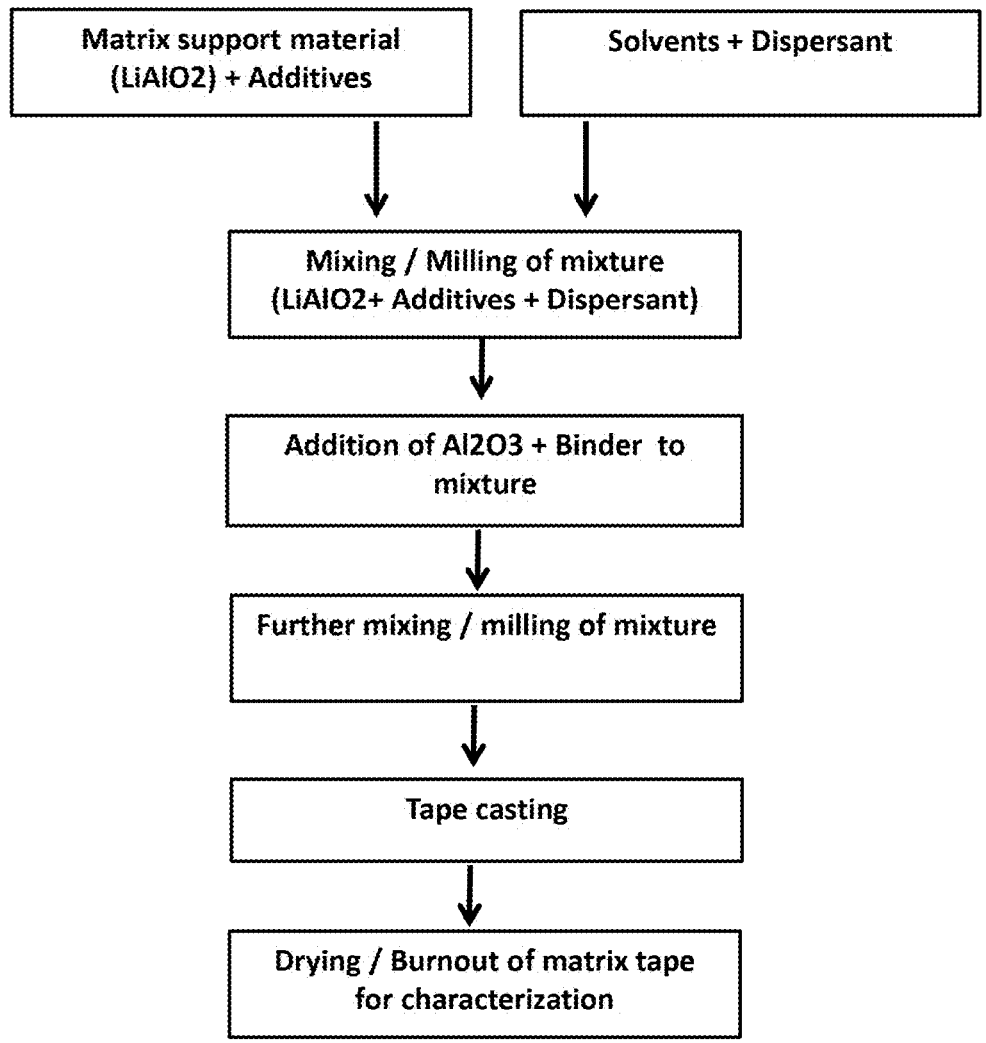
FIG. 1 shows a flow diagram of a method of producing an electrolyte matrix, according to an embodiment of the present invention.

The electrolyte matrices including the binder of the present invention exhibit improved flexibility, matrix particle packing density, strength, and pore structure. The electrolyte matrices achieve these improved properties due at least in part to the use of a binder that includes both a short chain polymer and a long chain polymer. The long chain polymer serves to increase the flexibility of the electrolyte matrix, producing beneficial handling properties and reducing the likelihood of cracks in the electrolyte matrix. The combination of the short chain polymer and the long chain polymer improve the interaction between the binder solution and the particles that make up the electrolyte matrix, thereby enhancing the particle packing density, pore size distribution, and mechanical properties of the electrolyte matrix.

The binder may be formed from a binder solution. The binder solution includes a short chain polymer, a long chain polymer, and a solvent. A plasticizer may also be included in the binder solution. The binder solution may be a uniform homogeneous solution.

The short chain polymer may be any appropriate polymer. The short chain polymer may have a molecular weight of at less than about 150,000, such as less than about 140,000, about 130,000, about 120,000, about 110,000, or about 105,000. A copolymer may be employed as the short chain polymer, such as a methacrylate copolymer. An exemplary short chain polymer is an ethyl methacrylate copolymer with a molecular weight of about 105,000. In some embodiments, the short chain polymer may be a polymer binder that is commonly utilized to form electrolyte matrices. The short chain polymer may be present in the binder solution in an amount of about 30 wt. % to about 40 wt. %.

The long chain polymer may be any appropriate polymer. The long chain polymer may have a molecular weight of at least about 200,000, such as at least about 210,000, about 220,000, about 230,00, about 240,000, or about 250,000. The molecular weight of the long chain polymer may be at least twice the molecular weight of the short chain polymer. A copolymer may be employed as the long chain polymer, such as a copolymer including methacrylate or acrylate. An exemplary long chain polymer is a methyl methacrylate-butyl acrylate copolymer with a molecular weight of about 250,000. The long chain polymer may be present in the binder solution in an amount of up to about 10 wt. %, such as an amount of about 1 wt % to about 10 wt. %, or about 2 wt. % to about 5 wt. %. In the event that the content of the long chain polymer is too high, the viscosity may be undesirably impacted and processing issues such as degassing and pumping difficulties may arise.

The solvent may be any appropriate solvent that is capable of forming a solution of the short chain polymer and the long chain polymer. The solvent may be an organic solvent, such as methyl ethyl ketone (MEK), cyclohexane, or combinations thereof. The solvent may be present in the binder solution in an amount of about 20 wt. % to about 60 wt. %.

The binder solution may include a plasticizer. The plasticizer may be any suitable organic plasticizer, such as a phthalate. In some embodiments, the plasticizer may be a butyl benzyl phthalate. The plasticizer may be present in the binder solution in an amount of about 10 wt. % to about 22 wt. %.

The binder solution may be combined with a support material, electrolyte material, and dispersant to form a slurry capable of forming an electrolyte matrix. The slurry may also include a reinforcing material for the purposes of increasing the compressive strength, crack resistance, and thermal cycle capability of the electrolyte matrix.

The support material may be any appropriate electrolyte support material, such as $LiAlO_2$. The $LiAlO_2$ support material may be in the γ or α form. The support material may have a Brunauer-Emmett-Teller (BET) surface area of about 10 $m^2$/g to about 24 $m^2$/g. The support material may be have any appropriate geometry, such as spherical or rounded particles or irregular particles. The support material may have a size dimension within a range of 0.1 nm to 100 nm.

The reinforcing materials may have any appropriate geometry, such as particles or fibers. Particles of reinforcing material may have a spherical shape, rounded shape, or disk shape. The reinforcing material may be formed of any appropriate composition, such as a metal or oxide material. The reinforcing material may be a coarse material, such as particles with a size of about 10 μm to about 120 μm. In some embodiments, the reinforcing material may include aluminum or alumina ($Al_2O_3$).

The electrolyte material may include any appropriate carbonate. In some embodiments, the electrolyte may include lithium carbonate ($Li_2CO_3$). The electrolyte may also optionally include sodium carbonate or potassium carbonate.

The dispersant may be any appropriate dispersant capable of preventing agglomeration of the matrix material particles. The dispersant may be an organic dispersant, such as fish oil or a polymeric surfactant. In some embodiments, the dispersant may be cationic surfactant, such as a polyester-polyamine condensation polymer. The dispersant may be present in the slurry in an amount of about 1 wt. % to about 10 wt. %, such as about 1 wt. % to about 8 wt. %.

The binder solution may be produced by any appropriate method. The binder solution may be formed by combining a short chain polymer, a long chain polymer, and a solvent.

A plasticizer may also be added to the binder solution. The short chain polymer, long chain polymer, plasticized, and solvent may be any of those described herein. The mixture may then be mixed, such as by stirring, to produce a uniform homogeneous binder solution. The mixing may continue for a period of about 1 hour to about 3 hours. The binder solution is then ready for use in the production of an electrolyte matrix.

The electrolyte matrix may be made by any appropriate process. In some embodiments, a heterogeneous electrolyte matrix may be produced by a process including forming a slurry containing a support material, electrolyte material, solvent, and dispersant. The slurry may then be milled before being combined with the binder solution. Reinforcing materials may be added to the mixture at the same time as the binder solution. The mixture may then be subjected to further milling, formed into an electrolyte matrix, and dried. The support material, electrolyte material, solvent, and dispersant may be any of those described herein.

An exemplary method for the fabrication of an electrolyte matrix is depicted in FIG. 1. The slurry may be formed by combining a mixture of a support material and additives with a mixture of a solvent and a dispersant. The electrolyte material may be included in the mixture of the support material and additives. The slurry may then be milled, such as by an attrition milling process. An exemplary attrition milling process is ball milling. The milling process may be continued until a desired particle size is achieved. The grinding media employed in the milling process may have a ball size of 0.3 mm to 3 mm, and may have a loading of about 60% to about 80%. The milling speed may be about 2,000 rpm to about 3,000 rpm.

After the desired particle size is achieved, the binder solution is added to the slurry. The binder solution may be added to the slurry in an amount of about 18 wt. % to about 22 wt. % of the slurry. The binder solution contributes to the stability of the slurry, preventing the separation of the slurry. A reinforcing material, of the types described above, may also be added to the slurry with the binder solution. In some embodiments, a pore forming material may also be added to the slurry. After the addition of these components, the slurry may be subjected to additional mixing or milling.

The slurry is then formed into an electrolyte matrix by any appropriate process. The forming process may be a tape casting process, such as with a doctor blade.

The formed slurry may be dried by any appropriate process. The drying may take place at a temperature of about 25° C. to about 30° C. for about 40 minutes to about 70 minutes. The dried electrolyte matrix may then be optionally cut to a desired size before being installed in a fuel cell.

The dried electrolyte matrix includes a binder formed from the binder solution. The dried electrolyte matrix may include about 4 wt. % to about 12 wt. % of the short chain polymer, about 0.1 wt. % to about 3 wt. % of the long chain polymer, and about 3 wt. % to about 9 wt. % of the plasticizer. The binder may be removed at high temperatures, during the initial start-up of the molten carbonate fuel cell. The binder is present in the electrolyte matrix when the electrolyte matrix is installed in a fuel cell, such that the binder is removed, or burned out, when the fuel cell is initially conditioned. In some embodiments, the binder may be removed from the electrolyte matrix for the purposes of characterizing the electrolyte matrix. The binder of the present invention exhibits complete or substantially complete combustion when treated at high temperature, resulting in complete or substantially complete removal of the binder from the electrolyte matrix.

The formed electrolyte matrix (e.g., in a green state, or before binder is burned out) is substantially free of large pores. In some embodiments, the electrolyte matrix may be substantially free, or free, of pores with a size greater than or equal to about 0.6 µm. In some other embodiments, the electrolyte matrix (e.g., in a conditioned state, or after binder is burned out) may be substantially free, or free, of pores with a size greater than about 0.2 µm. The electrolyte matrix may be substantially free, or free, of pores with a size greater than or equal to about 0.6 µm after operation of a fuel cell (e.g., under accelerated long-term tests). In some embodiments, less than 10% of the pores of the electrolyte matrix may be larger than 0.2 µm at the beginning of life.

The electrolyte matrices described herein may be employed in any molten carbonate fuel cell. The electrolyte matrices may be disposed between a porous anode and a porous cathode. The porous anode may be nickel stabilized against sintering by the addition of chromium and/or aluminum. The porous cathode may be in-situ oxidized and lithiated nickel oxide.

The electrolyte matrices described herein exhibit improved performance. The electrolyte matrices have increased flexibility, reducing the likelihood of damage to the matrices during handling. The increased flexibility allows the electrolyte matrix to be more resilient when subjected to manufacturing processes including casting carrier release, lamination, trimming, and handling, thereby preventing the formation of cracks and chips in the electrolyte matrix. Cracks in the electrolyte matrix may reduce the gas sealing efficiency of the electrolyte matrix during fuel cell operation. The electrolyte matrices also exhibit increased mechanical strength, improved pore size distribution, and increased particle packing density.

The electrolyte matrices produced with the binder solution of the present invention are capable of maintaining an appropriate electrolyte fill level over a useful life of more than 5 years. The useful life of an electrolyte matrix may depend on multiple factors, one of which may be the pore sizes present at the beginning of life (e.g., after conditioning, or after burning out the binder, i.e., at the early stages of operation of the fuel cell). The electrolyte matrices disclosed herein may have a pore size of less than 0.2 µm at the beginning of life, increasing the electrolyte retention. In some embodiments, less than 10% of the pores of the electrolyte matrix may be larger than 0.2 µm at the beginning of life.

Exemplary Embodiments

A binder solution was prepared by mixing an ethyl methacrylate copolymer with a molecular weight of about 105,000 (such as Paraloid® B-72), a methyl methacrylate-butyl acrylate copolymer with a molecular weight of about 250,000 (such as Paraloid® B48N), a butyl benzyl phthalate (such as Santicizer® S160) as a plasticizer, and a solvent. The solvent may be methyl ethyl ketone (MEK) or a mixture of MEK and cyclohexane. The B-72 was added in an amount of about 30% to about 40%, the B48N was added in an amount of about 1 wt. % to about 10 wt. %, and the S160 was added in an amount of about 10 wt. % to about 22 wt. %. The mixture was then stirred energetically for a time period of about 1 hour to about 3 hours until a homogeneous and uniform binder solution was produced.

A matrix support material ($LiAlO_2$) was mixed with $Li_2CO_3$ and milled together to achieve the desired average particle size. The milling/mixing was performed in a solvent, such as MEK or a mixture of MEK and cyclohexane with 1 wt. % to 10 wt. % of a dispersant (such as fish oil) to prevent re-agglomeration of particles. An attrition milling technique using a grinding media having 0.3 mm to 3 mm ball size was used to mill the mixture of $LiAlO_2$ and $Li_2CO_3$. The grinding media loading varied between 60% and 80% and the grinding speed was between 2000 rpm and 3000 rpm. After achieving the desired particle size, alumina and aluminum particles were added to the milled mixture of $LiAlO_2$ and $Li_2CO_3$ as reinforcing materials. The binder solution was added to the milled mixture along with the reinforcing materials.

The slurry was then tape cast using a doctor blade and dried at a temperature between 25° C. and 30° C. for a time of 40 minutes to 70 minutes to form green sheets. The green sheets were then laminated and tested in single cells for a performance and life stability evaluation. The green sheets were also heat treated at about 500° C. for about 2 hours to remove the binder and allow for pore structure characterization and snap strength measurements.

Comparative electrolyte matrices were also prepared by similar methods, with the difference being that the binder solution did not include the second polymer with a molecular weight of about 250,000. Such comparative binder solutions may be referred to herein as a baseline binder, while the binder of the present invention may be referred to as an advanced binder.

Figure 2:
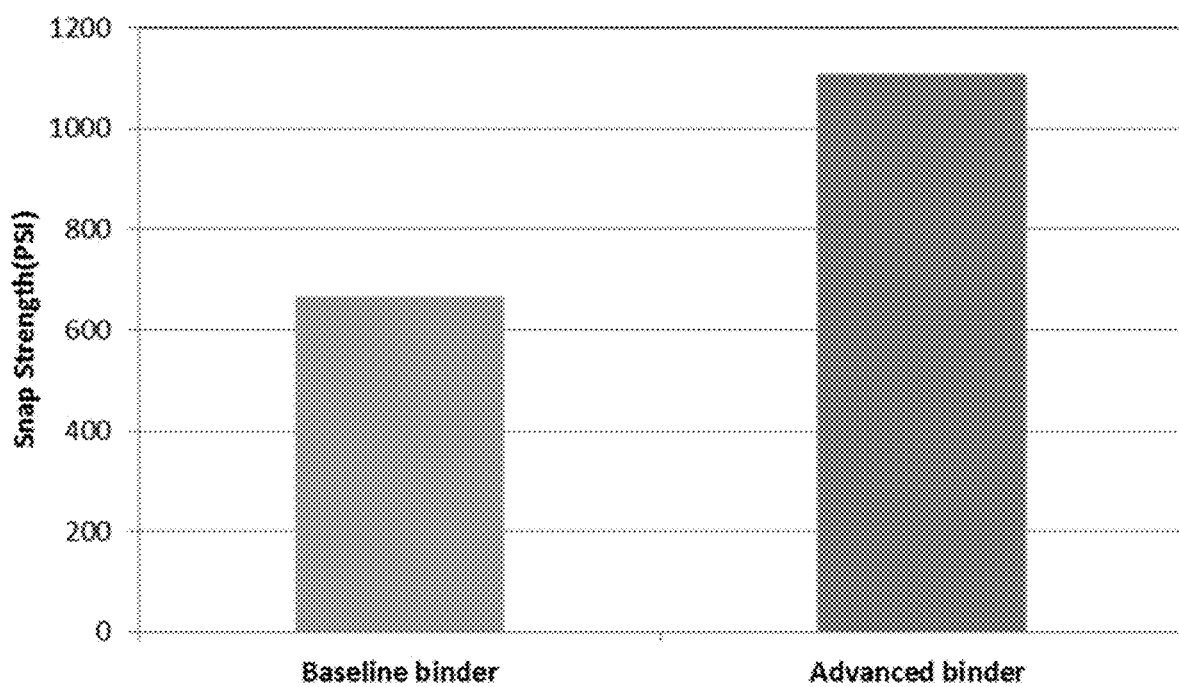
FIG. 2 shows the snap strength of an electrolyte matrix including a conventional binder and an electrolyte matrix including a binder according to an embodiment of the present invention.

Three point bending tests on the heat treated sheets were performed. The matrices formed with the binder solution of the present invention exhibited a snap strength of about 1,100 psi, while the baseline binder matrices exhibited a snap strength of about 660 psi, as shown in FIG. 2. Thus, the binder solution of the present invention produced an improvement of 70% to 80% in comparison to the baseline binder. This improvement may be the result of improved particle packing density within the matrix, which may be due at least in part to improved interaction between the binder system and the support particles of the matrix. The packing density improvement eliminates large pores in the matrix and enhances contact between the support material particles, producing an increased skeletal density after removal of the binder.

In some embodiments, the formed electrolyte matrix may exhibit a snap strength of greater than 1,000 psi.

Figure 3:
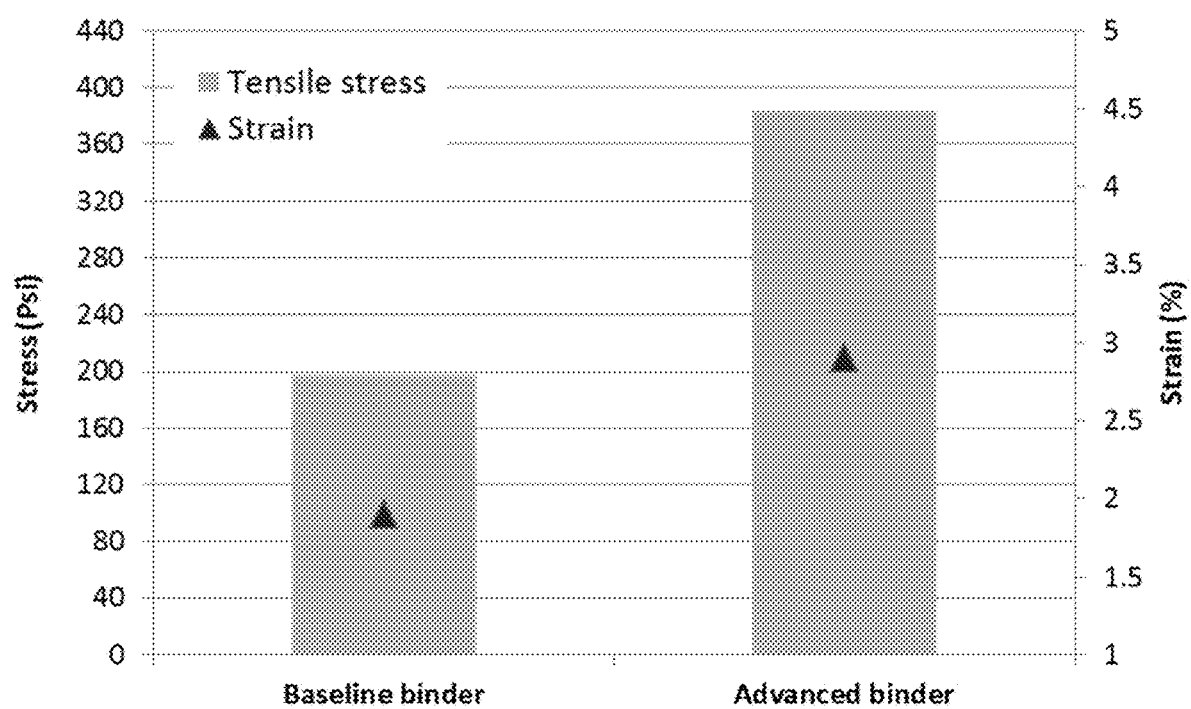
FIG. 3 shows the tensile stress and strain of a green electrolyte matrix including a conventional binder and a green electrolyte matrix including a binder according to an embodiment of the present invention.

As shown in FIG. 3, a green as cast matrix including a binder solution of the present invention exhibits a tensile strength and strain that are increased by greater than 90% and 50%, respectively, in comparison to a green as cast matrix that includes the baseline binder. This improvement may be due at least in part to the increased flexibility of the binder solution of the present invention.

The electrolyte matrices were also tested in several bench-scale, single cells (250 $cm^2$) to determine the performance and stability of the electrolyte matrix. Each single cell assembly included a porous Ni—Al and/or Ni—Cr anode and a porous in-situ oxidized and lithiated NiO cathode, separated by the electrolyte matrix. The cathode (250 $cm^2$) was filled with an appropriate amount of Li/K or Li/Na electrolyte such as 62 mol % $Li_2CO_3$/38 mol % $K_2CO_3$ or 52 mol % $Li_2CO_3$/48 mol % $Na_2CO_3$. An appropriate amount of $Li_2CO_3Na_2CO_3$ or $Li_2CO_3/K_2CO_3$ electrolyte was also stored in the cathode current collector to achieve the necessary electrolyte balance. A comparative example was also tested that included an electrolyte matrix formed with the baseline binder solution.

Figure 4:
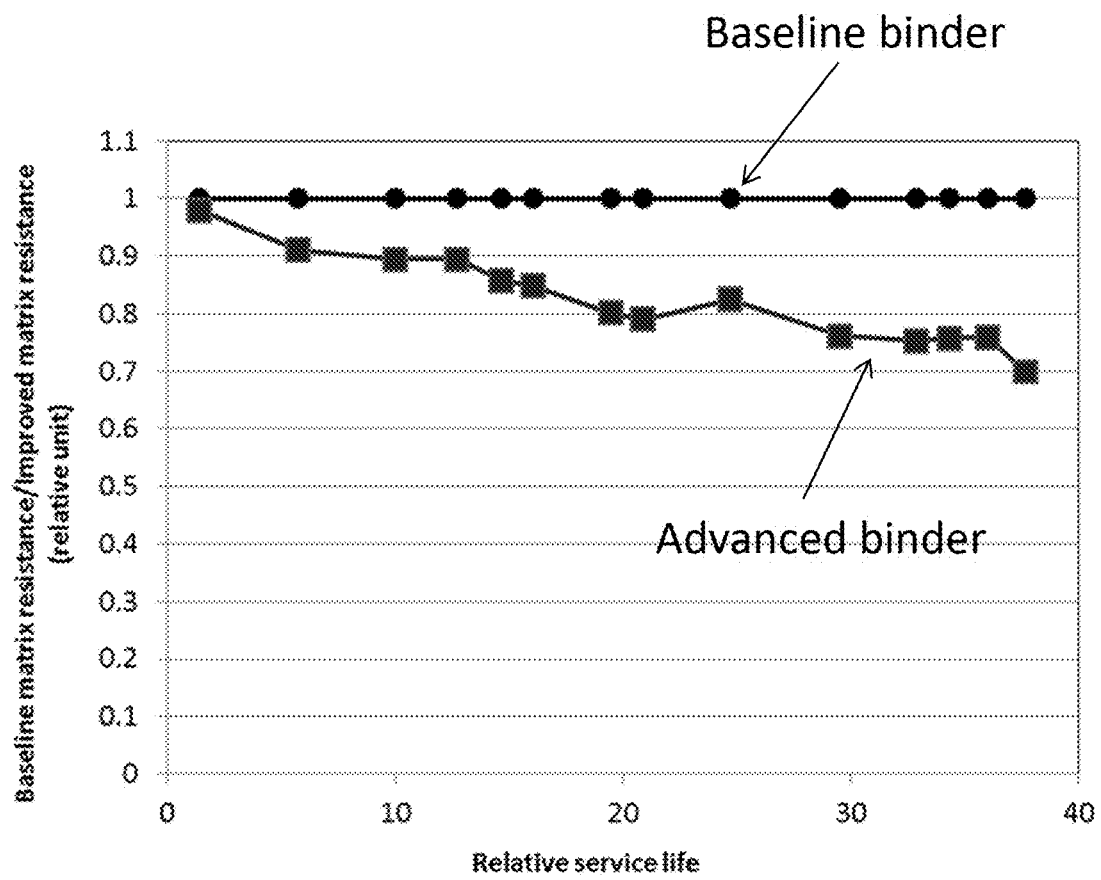
FIG. 4 shows the variation of the resistance of an electrolyte matrix including a binder according to an embodiment of the present invention relative to an electrolyte matrix including a conventional binder as a function of service life.

The anode gas for the test was 72.8% $H_2$-18.2% $CO_2$-9% $H_2O$ and the cathode gas was 18.5% $CO_2$-12.1% $O_2$-66.4% $N_2$-3% $H_2O$. Tests were performed under accelerated conditions in terms of temperatures (665° C.) and fuel utilization (80%). Cell resistance, voltage and gas cross-over stability were monitored with the passage of time to evaluate the performance and stability of the electrolyte matrix. The tests were performed at 160 $mA/cm^2$. FIG. 4 shows the resistance stability comparison under accelerated conditions between the electrolyte matrix formed with the binder solution of the present invention and the electrolyte matrix formed with baseline binder solution. The electrolyte matrix produced with the binder solution of the present invention exhibited a greater than 30% improvement in resistance stability when compared to the electrolyte matrix formed with the baseline binder solution. The improvement may be due to improved capillary force as a result of improved matrix particle packing which produces a stable pore structure, as revealed by post-test analysis. The binder solution of the present invention eliminates the formation of large pores (>0.2 μm) at the beginning of the electrolyte matrix lifetime, which helps to reduce matrix particle coarsening during cell operation, maintain stable capillary force for electrolyte retention, and maintain cell performance.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A green electrolyte matrix, comprising:
   a support material;
   an electrolyte material; and
   a binder,
   wherein the binder comprises a first polymer with a molecular weight of less than 150,000 and a second polymer with a molecular weight of greater than 200,000; and
   wherein the green electrolyte matrix is configured to be installed in a fuel cell; and
   wherein the binder is configured to be removed from the green electrolyte matrix when the fuel cell is initially conditioned, so as to define an electrolyte matrix that is free of pores with a size of 0.2 μm or greater.

2. The green electrolyte matrix of claim 1, wherein the first polymer is present in the electrolyte matrix in an amount of 4 wt. % to 12 wt. %.

3. The green electrolyte matrix of claim 1, wherein the first polymer comprises an ethyl methacrylate copolymer.

4. The green electrolyte matrix of claim 1, wherein the second polymer is present in the electrolyte matrix in an amount of 0.1 wt. % to 3 wt. %.

5. The green electrolyte matrix of claim 1, wherein the second polymer comprises a methyl methacrylate—butyl acrylate copolymer.

6. The green electrolyte matrix of claim 1, wherein the molecular weight of the second polymer is at least twice the molecular weight of the first polymer.

7. The green electrolyte matrix of claim 1, wherein the binder further comprises a plasticizer.

8. The green electrolyte matrix of claim 1, wherein the support material comprises lithium aluminate.

9. The green electrolyte matrix of claim 1, wherein the electrolyte material comprises lithium carbonate.

10. The green electrolyte matrix of claim 1, further comprising a reinforcing material.

11. The green electrolyte matrix of claim 1 further comprising a cationic surfactant dispersant.

12. The green electrolyte matrix of claim 11, wherein the cationic surfactant dispersant is a polyester-polyamine condensation powder.

13. The green electrolyte matrix of claim 7, wherein the plasticizer is a butyl benzyl phthalate.

* * * * *